United States Patent
Hurlebaus

[15] 3,671,713
[45] June 20, 1972

[54] ARC SPOT WELD CONTROL AND POWER SUPPLY

[72] Inventor: Richard P. Hurlebaus, Huntingdon Valley, Pa.

[73] Assignee: The Budd Company, Philadelphia, Pa.

[22] Filed: Nov. 25, 1968

[21] Appl. No.: 778,437

[52] U.S. Cl. .................................. 219/127, 219/131 R
[51] Int. Cl. ................................................ B23k 9/00
[58] Field of Search ........... 219/127, 113, 131, 131 R, 135; 320/1; 321/8; 315/137, 141, 227.1

[56] References Cited

UNITED STATES PATENTS

| | | |
|---|---|---|
| 2,583,665 | 1/1952 | Pilia .................................. 219/127 |
| 3,113,259 | 12/1963 | Walker .............................. 321/4 X |
| 3,299,249 | 1/1967 | Sciaky .............................. 219/127 X |
| 3,339,107 | 8/1967 | Aldenhoff .......................... 219/131 X |
| 3,371,242 | 2/1968 | Aldenhoff .......................... 315/139 |
| 3,375,427 | 3/1968 | Magner et al. ..................... 321/24 X |

Primary Examiner—J. V. Truhe
Assistant Examiner—L. A. Schutzman
Attorney—Thomas I. Davenport, Edward M. Farrell, Alford L. Trueaz, Jr. and William R. Nolte

[57] ABSTRACT

A three phase power source is used to trigger a welding gun. A timing circuit produces a series of pulses to actuate switching circuits to permit application of the power from the three phase power supply to the welding gun.

3 Claims, 3 Drawing Figures

Patented June 20, 1972 3,671,713

INVENTOR.
RICHARD P. HURLEBAUS
BY Edward M. Farrell
ATTORNEY

ARC SPOT WELD CONTROL AND POWER SUPPLY

Power supplies in welding circuits have taken a wide variety of different forms. In many such circuits, problems have been encountered where single phase power supply circuits were used. One reason for this is that the use of a single phase voltage produces a ripple so large that maintaining the arc is difficult. To overcome this ripple, relatively large inductances have been inserted in the welding current line. These large inductances, while eliminating the ripples, produced slow current rises. This is objectionable because of the time lost as the welding current is being built up.

It is an object of this invention to provide an improved arc welding system.

It is a further object of this invention to provide an improved arc welding system wherein adverse effects of ripple from the power supply is minimized.

It is still a further object of this invention to provide an improved arc welding system wherein the time required for the output current to rise to the working level is minimized.

In accordance with the present invention, a system for providing high energy pulses to a welding torch includes a source of alternating current of three phases. A pulse circuit produces pulse signals for gating the source of power to the torch. A timing circuit controls the time during which the current is applied.

Other objects and advantages of the present invention will be apparent and suggest themselves to those skilled in the art, from a reading of the following specification and claims, in conjunction with the accompanying drawings, in which:

Figure 1:
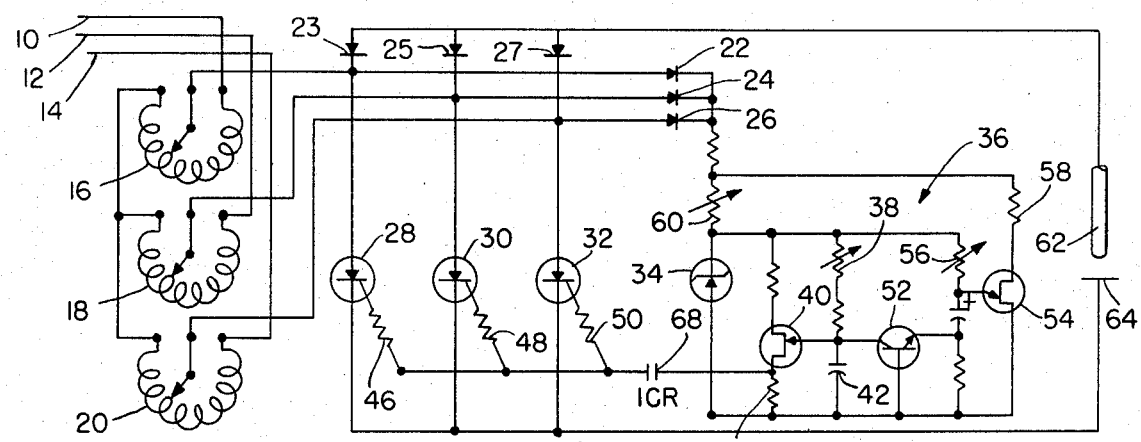
FIG. 1 is a schematic diagram illustrating a firing circuit for a welding torch, in accordance with the present invention.
Figure 2:
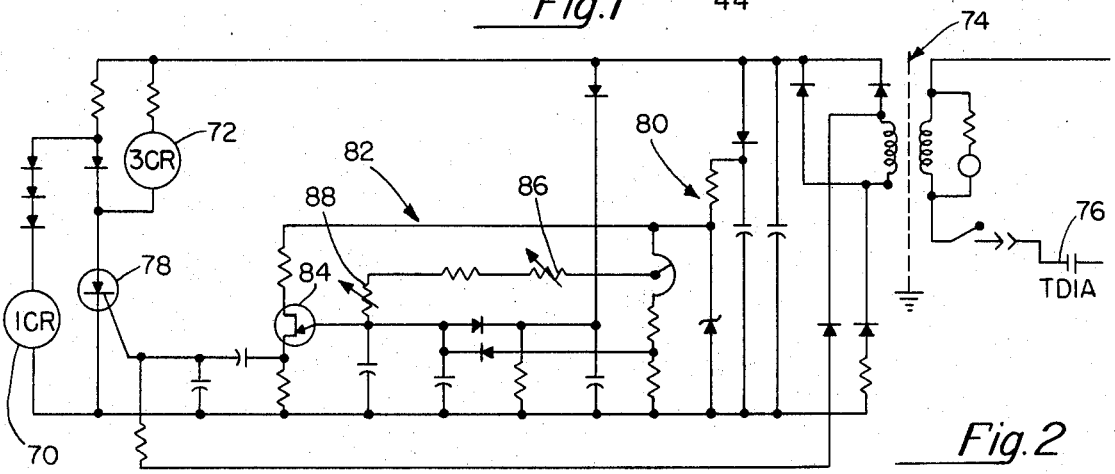
FIG. 2 is a schematic diagram illustrating a timing circuit, in accordance with the present invention.
Figure 3:
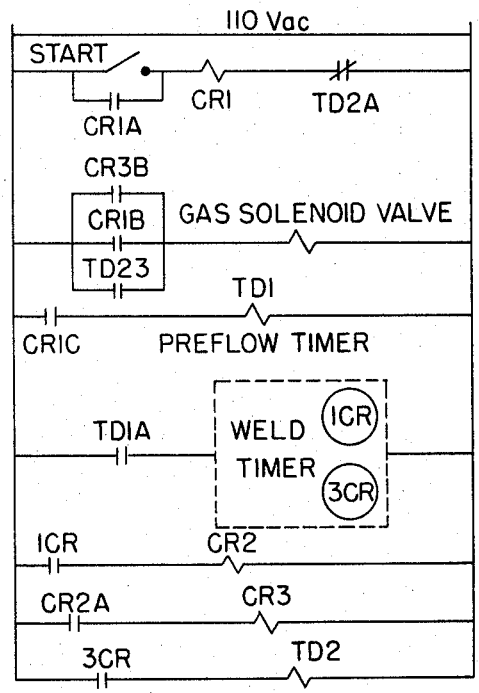
FIG. 3 is a diagram illustrating the sequencing operation of the welding torch, which may be employed in connection with the present invention.

Basically, FIG. 1 includes the source of power together with the various gating circuits for connecting the source of power to the torch. FIG. 2 includes means for controlling the duration of the application of power to the torch. FIG. 3 is a schematic which includes various switching circuits which are used in many conventional welding circuits. While the circuit in FIG. 3 is representative of most welding circuits and not directly related to the subject invention, it is shown and will be generally described for purposes of clarity.

Referring particularly to FIG. 1, as is well known, a silicon controlled rectifier offers a convenient means of control for DC power supplies operated from a three phase AC power source. AC power is applied through lines 10, 12 and 14 to step down transformers 16, 18 and 20, respectively.

Diodes 22, 24 and 26 rectifies the AC voltage and provides a positive 117 V.D.C. voltage for the control circuit. Any time that the anode voltage of one of the controlled rectifiers 28, 30 or 32 becomes positive with respect to the signal on the AC line, current will flow in that line. Diodes 23, 25 and 27 are blocking diodes.

A Zener diode 34 is used to clip the D.C. voltage thereacross to approximately 20 volts. This voltage is used to supply power for a unijunction, relaxation oscillator 36. A variable resistor 38 controls the firing angle of the unijunction transistor 40 by regulating the charging rate of a capacitor 42. When the unijunction transistor 40 discharges the capacitor 42, a voltage pulse is developed across resistor 44. This voltage pulse is coupled to the gate lead of each of silicon control rectifiers 28, 30 and 32 through resistors 46, 48 and 50, respectively. The particular silicon controlled rectifier with the most positive anode voltage when the gate pulse appears begins conduction.

Transistors 52 and 54 are used to prevent the unijunction transistor 40 from causing a firing angle greater than 120°. The transistor 54 is a unijunction oscillator that starts its timing cycle at the same moment as the unijunction transistor 40. A variable resistor 56 is adjusted so that the unijunction transistor 54 fires at an angle that is less than 120°. When the unijunction transistor 54 fires, it causes the transistor 52 to conduct and discharge the capacitor 42.

It is important that the unijunction transistor 54 keep the firing angle at less than 120°. The base of the unijunction transistor 54 is connected by a resistor 58 to a resistor 60, which is also variable. This helps to maintain the timing cycle of the unijunction transistor 54 less than the required 120°, independent of line voltage variations. The base of the unijunction transistor 40 is also connected to the resistor 60 and provides compensation for line voltage variation. For example, with the value of the resistor 60 equal to 350 ohms and a load of 10 ohms, a DC load voltage of 92 volts was obtained with a 110-volt AC supply, and a DC load of 93 volts was obtained with a 130-volt AC supply. With this circuit using a three phase, 117 volts, AC supply, the output voltage can be varied from 40 volts to 150 volts DC. When a selected one of the silicon control rectifiers 28, 30 or 32 is triggered or gated, power is applied to a torch 62. An arc is created between the torch 62 and a work piece 64. This arc is used to create the heat necessary for a welding operation.

As is normal in many arc welding circuits, various control means for applying an inert gas in the area of the weld must be provided. These operations will be described generally in connection with FIG. 3 to follow.

The resistor 60 also serves another useful purpose. By connecting the base of the unijunction transistor 40 to the top of the resistor 60, a marked degree of regulation of the DC output voltage is provided for AC line voltage variations. If the line voltage rises, the inner base bias voltage and therefore the peak point emitter voltage of the unijunction transistor 40 rises depending on the setting of the resistor 60. Since the emitter charging circuit through the resistor 38 is connected to the fixed voltage across the Zener diode 34, the DC voltage is maintained constant.

A pair of normally open contacts 68 is connected from the resistor 44 to gate leads of the silicon control rectifiers 28, 30 and 32. With these contacts open, all of the silicon control rectifiers will remain non-conducting. When the contacts are closed, in a manner to be described, pulse signals from the resistor 44 are applied to the silicon control rectifiers 28, 30 and 32, with one of the silicon control rectifiers becoming conducting to cause a signal to be applied to the torch 62.

Referring particularly to FIG. 2, the timing circuits for gating the respective silicon control rectifiers 28, 30 and 32 is illustrated. In general, this circuit is used to generate a start and end signal which controls the duration of conduction of the silicon control rectifiers of FIG. 1.

The start of the weld time cycle is controlled by the actuation of a relay 70 which closes the contact 68 (FIG. 1). The end of this weld time cycle is controlled by the actuation of a relay 72.

A source of power is applied to a transformer 74 which steps down the input voltage to a desired level, which for example may be 20 volts. The voltage is applied when the contacts 76 are closed. Under these circumstances, voltage is applied to the relay 70 to close the contact 68 (FIG. 1) to control the operation of the circuit illustrated in FIG. 1. A silicon control rectifier 78 is normally non-conducting to maintain the relay 72 inoperative. When the silicon control rectifier becomes conducting, the relay 72 is actuated. Under these conditions, with the silicon control rectifier 78 conducting, the relay 70 becomes non-conducting to again open the contacts 68. It is therefore seen that the time during which the contacts 68 are closed is controlled by the operation of the starting relay 70 and the ending relay 72.

Various elements are provided to produce a DC signal in a network 80. The DC voltage applied at the network 80 controls the operation of a charging and discharging circuit 82 which in turn maintains a unijunction transistor 84 in a conducting or non-conducting state. Variable resistors 86 and 88 are provided to provide fine and coarse control of the duration of the weld time material. Thus, in general, it may be said that the unijunction transistor 84 is capable of generating a pulse signal at the end of the weld time to control the operation of the silicon control rectifier 78 causing it to conduct. The silicon control rectifier 78, in turn, controls the operation of the relays 72. Conduction of the silicon control rectifier 78 causes the relay 70 to drop out.

The various operations of the timing circuit are not described in detail because they are considered to be conventional and well known to those skilled in the field. Also, various other types of timing circuits may be employed to control the operation of the start relay 70 and the end relay 72.

Referring particularly to FIG. 3, some features, such as gas control found in conventional arc welding systems, are discussed briefly to illustrate the sequence of operation of a system built in accordance with the present invention. A switch indicated as the start switch is closed to energize a relay indicated as CR1. When the relay CR1 operates, a contact CR1A acts as a holding contact.

At this point, a shielding gas solenoid may be energized so that the gas begins to flow through the welding torch 62 in a conventional manner not illustrated. When CR1 is energized, contact CR1B energizes the coil for a time delay relay TD1. This relay controls the pre-flow time for the shielding gas. When TD1 times out, the contact TD1A (Contact 76 in FIG. 2) permits 110 volts AC to be applied to the weld timer control circuit.

As mentioned in connection with FIG. 2, the relatively high AC voltage is transformed to a lower voltage for relay control and is rectified and regulated for the weld time interval. When power is supplied to the circuit, the time function begins and the relay 1CR (relay 70 in FIG. 2) is energized at the beginning of the weld time interval. The normally open contacts 1CR are in the gating circuit for silicon control rectifiers 28, 30 and 32. This control permits pulses from the firing circuit to gate the silicon control rectifiers for the duration of the weld time.

When the weld time interval is completed, a pulse is formed which gates the silicon control rectifier 78 which permits current to flow in the relay coil 3CR (72 in FIG. 2) which is energized at the end of the weld time interval. A normally open contact in 1CR also energizes the coil to relay CR2 which energizes the coil of relay CR3. The contact CR3 acts as a holding contact to maintain gas flow during the weld time interval.

When relay 3CR is energized, the contacts energize the coil of the time delay TD2 to control the post flow of the shielding gas. A normally closed contact in TD2 is opened when the coil is energized thus opening the sequence control circuit to prevent repeating.

The firing circuit power source and torch are interconnected and operate as described. The three phase power source may provide voltage at 230 volts AC, for example, which is transformed to the 117–90 volts AC by the step down transformers.

The main feature in the present invention resides in the provision of a three phase system which minimizes the adverse effects of ripple in a welding system. The minimizing of the adverse effects of this ripple also minimizes the likelihood of the welding arc being extinguished during operation. Another feature of the present invention resides in a circuit which is relatively free of high inductances thereby permitting a relatively fast rise time so that the maximum current can be applied to the torch as quickly as possible.

The pulses from the pulse circuit 36 will be applied to the silicon control rectifiers 28, 30 and 32 at intervals dependent upon the phase shift angles but at no time greater than 120°. This will coincide with the peaks of the AC voltages. The phase at which the firing occurs is important so as to provide the maximum current to the torch.

The silicon control rectifiers 28, 30 and 32 will be fired when they are at one polarity, which may be positive in the system illustrated. However, the circuit could be modified to permit firing when the applied signals are of negative polarity. In some applications it may be desirable to have the rectifiers fire as both positive and negative levels. For example, the positive power pulses may be applied to one set of torches with the negative power pulses being applied to a second set of torches. This would require some additions and modifications to the system illustrated but would not depart from the scope of the invention.

What is claimed is:

1. In combination with a torch for creating an arc for spot welding, a system for providing high energy pulses of one polarity to said torch comprising a source of alternating voltage of three phases, means for rectifying said voltages to produce DC voltages of three phases, a pulse forming circuit for producing pulse signals, a plurality of normally non-conducting silicon controlled rectifiers electrically connected in a path between said torch and said source of power, said path being substantially free of inductive reactance elements, means for applying said rectified DC voltages to said silicon controlled rectifiers, a normally open switch, a timing circuit for producing electrical signals for selectively closing said switch for predetermined time periods, means for applying said pulse signals through said switch to cause said silicon controlled rectifiers to become conductive to permit high energy pulses to be applied to said torch to produce arcing current across said torch when any of said three DC voltages exceed a predetermined level.

2. The invention as set forth in claim 2 wherein a pair of relays are provided in said timing circuit, with the first of said relays controlling the start of the current application to said torch and the second of said relays controlling the termination of the current to said torch.

3. The invention as set forth in claim 2 wherein the activation of said second relay causes said first relay to become unactivated.

* * * * *